INVENTORS.
EDWARD M. MASSELL
GUENTER HAGEDORN
BY
Allan Ratner

Oct. 1, 1968  E. M. MASSELL ET AL  3,404,309
DISPLAY SYSTEM

Filed Aug. 23, 1965  10 Sheets-Sheet 6

INVENTORS.
EDWARD M. MASSELL
GUENTER HAGEDORN
BY
Allan Ratner

Oct. 1, 1968    E. M. MASSELL ET AL    3,404,309
DISPLAY SYSTEM
Filed Aug. 23, 1965    10 Sheets-Sheet 7
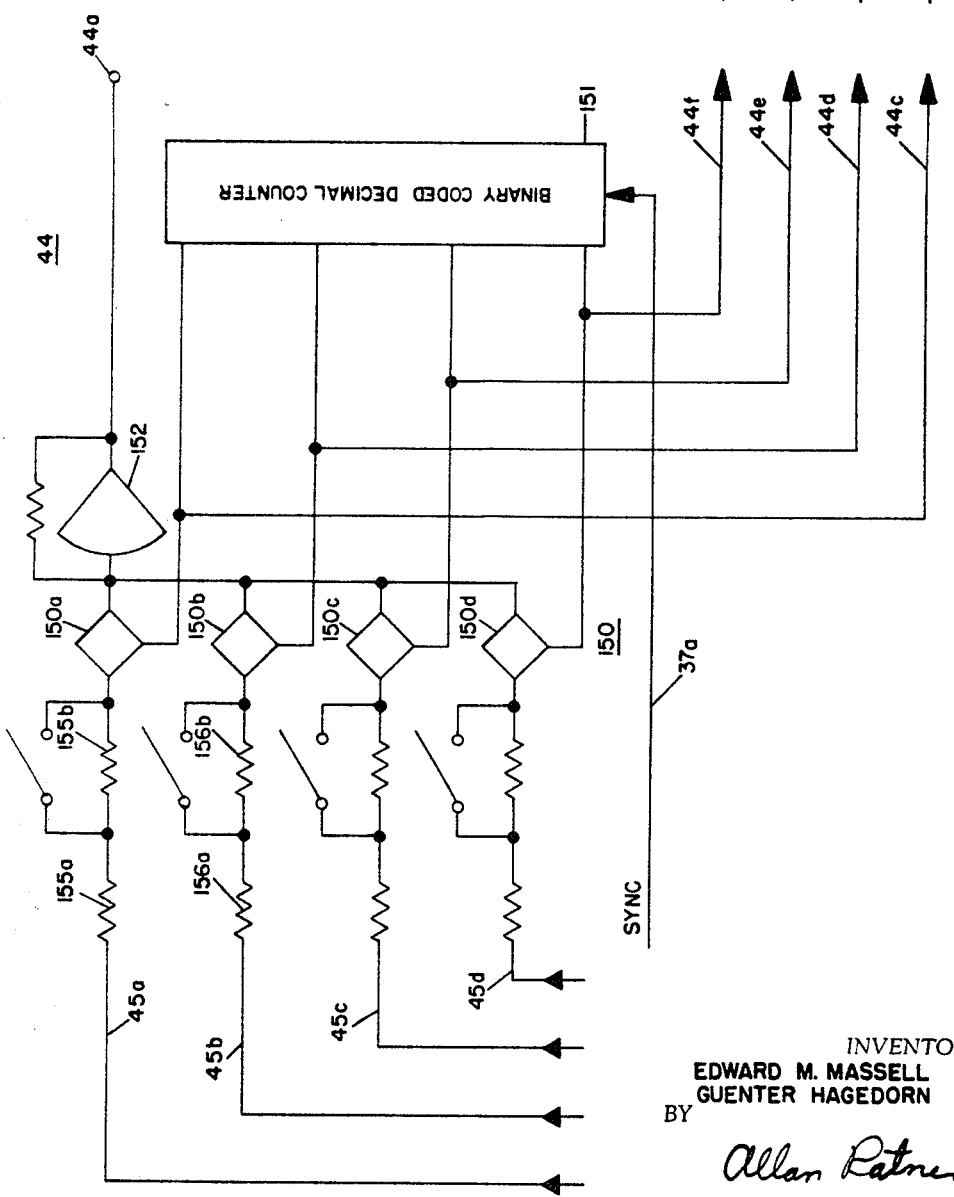
INVENTORS.
EDWARD M. MASSELL
GUENTER HAGEDORN
BY
Allan Ratner INVENTORS.
EDWARD M. MASSELL
GUENTER HAGEDORN
BY Allan Ratner

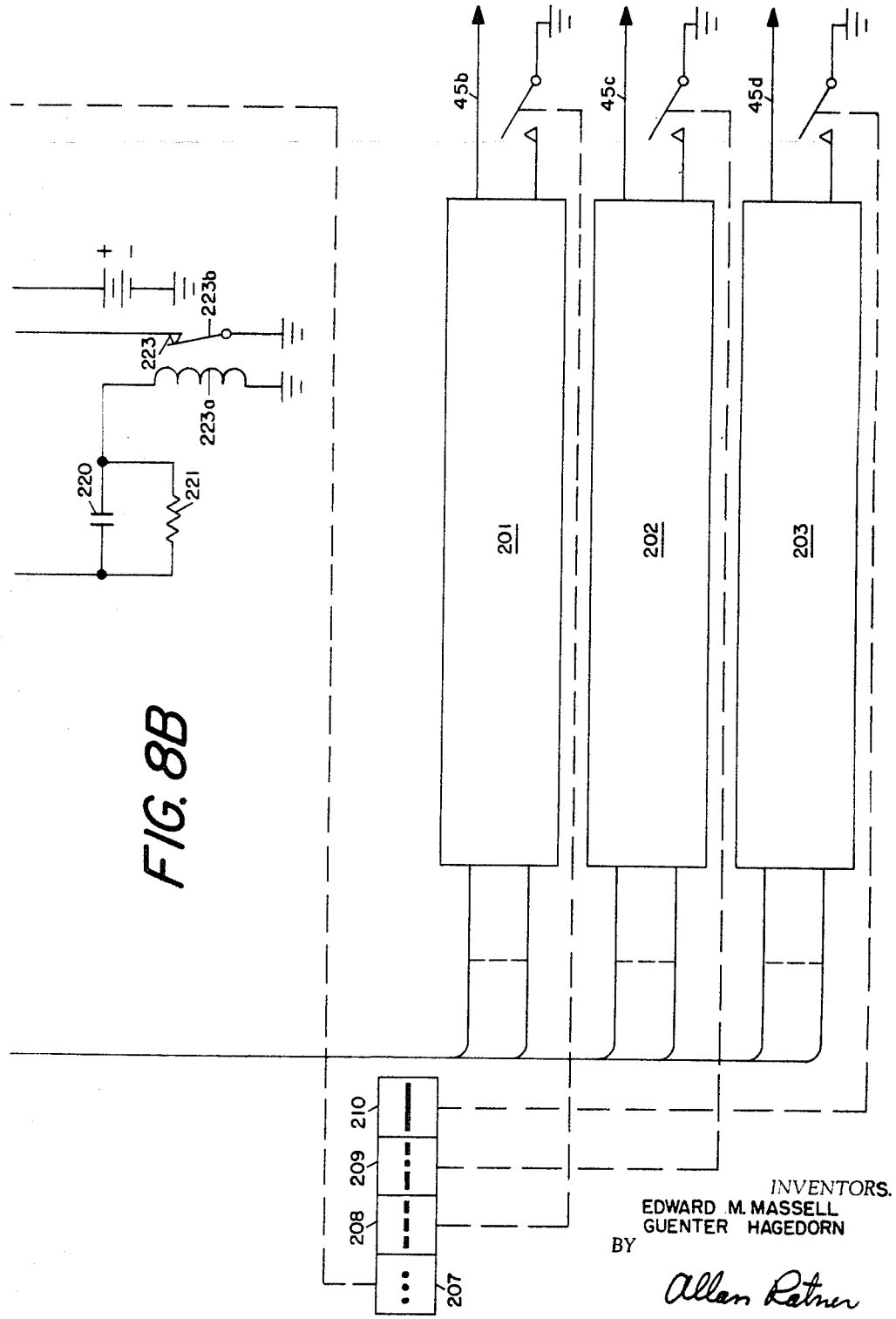

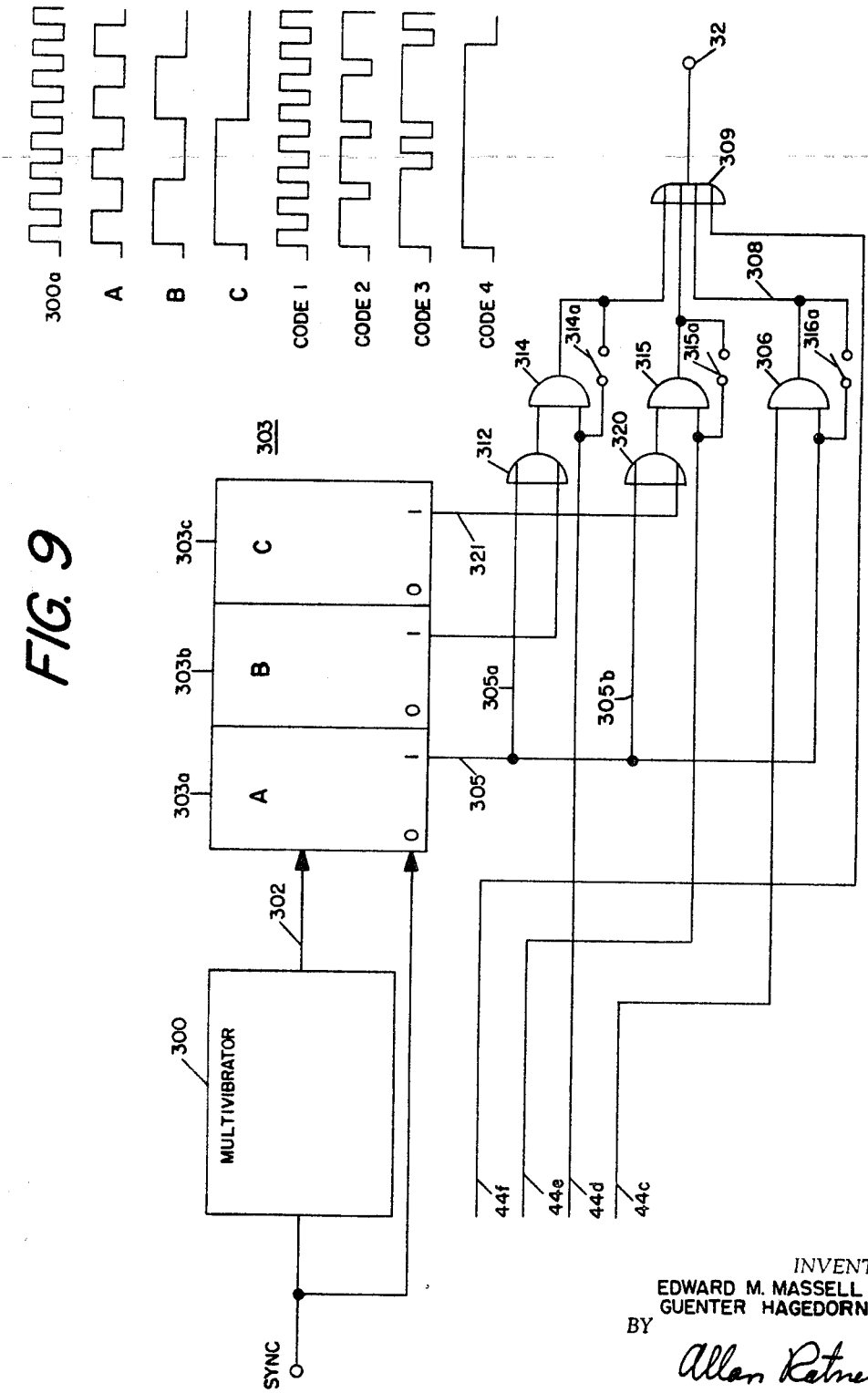

United States Patent Office 3,404,309
Patented Oct. 1, 1968

3,404,309
DISPLAY SYSTEM
Edward M. Massell, Red Bank, N.J., and Gunther Hagedorn, Soberg-Copenhagen, Denmark, assignors to Electronic Associates, Inc., Long Branch, N.J., a corporation of New Jersey
Filed Aug. 23, 1965, Ser. No. 481,838
24 Claims. (Cl. 315—18)

ABSTRACT OF THE DISCLOSURE

Plural information signals may be coded for display on the face of a cathode ray tube by time multiplexing the plural information signals with each other, sweep and grid pattern signals, and timing signals whereby the information signals are applied to the tube only during the times between display of the grid pattern signals as controlled by the timing signals.

---

This invention relates to a display system and more particularly to a system for displaying a predetermined number of periodically applied signals on the cathode ray tube screen of an oscilloscope.

In prior display systems, periodically applied information signals have been displayed with respect to a reference frame. In many such systems, the reference frame was comprised of a grid formed either mechanically, or electronically, on the screen of a cathode ray tube of an oscilloscope. By using an electronic rather than a mechanical grid there results greater system accuracy due to inherent nonlinearity compensation. Such compensation is effective in the deflection system as well as in the tube for the reason that the same nonlinearities which affect the "writing" of the electronic grid also equally affect the plurality of information signals being shown on the screen. Therefore, when the information signals are measured with respect to the grid, errors from nonlinearities are not measured. This compensation for nonlinearity is of particular importance when high accuracy is required as for example when the information signals are taken from an analog computer.

Prior systems, having electronic grids, have used a magnetic deflection system in which a grid has been generated by comparing a raster against known reference voltages. In this manner, by way of intensity modulation of the cathode ray tube a plurality of dots are produced on the screen forming an electronic grid. Further, the information signals have been displayed on the screen by comparing the signal voltages against the same raster and then by means of intensity modulation a series of dots are produced displaying the information signals. However, such prior systems have the disadvantage that the raster has a limited resolution. Another disadvantage results from the fact that the dot density is a function of the slope of the input information signal which results in a discontinuance display for signals with large slopes. In addition, there are various errors and nonlinearities in practical applications of prior systems, since they contained a magnetic deflection system. Accordingly, an object of the present invention is to eliminate errors and nonlinearities of display systems and to provide a display independent of signal slope with constant display resolution.

Another object of the present invention is a system for displaying a predetermined number of periodically applied information signals with reference to an electronic grid on a screen of a display tube in which the information signals and the grid are repetitively displayed by continuous trace lines.

A further object of the present invention is a repetitive display system for a plurality of analog signals in which there is negligible error between the information signal being displayed and the electronic grid.

In accordance with the invention, there is provided a source of timing signals and a source of grid producing signals. A plurality of information signals are applied to selector control means which provides a repetitive output of a sequence of selected information signals. The sequenced information signals, the timing signals, and the grid signals, are all applied to a display control means which is effective to apply the grid signals to the display tube to write the grid on the screen as continuous lines and to apply the information signal to the tube to write the information signals as continuous lines with the grid being written between information signals. In this manner, a predetermined number of selected information signals are displayed and accurately calibrated with reference to an electronic grid. Such accurate calibration is achieved since the display control means introduces substantially small error.

Further in accordance with the invention the selector control means includes a plurality of matrices in number at least equal to the number of information signals being displayed. The matrices are operable for producing at each matrix output an individually selected information signal. Sequencing means is connected to the outputs of the matrices and to the timing signal source for sequencing the information signals in time between discrete timing (synchronization) signals.

There is further provided counter means connected to the timing signal source for producing a plurality of chains of pulses. Differing ones of the chains of pulses are combined to produce resultant coded signals with a different coded signal corresponding to a particular periodically applied information signal. The coded signals are applied to the tube to differently portray each periodically applied information signal so that the displayed signals may be visually recognized one from another.

For further objects and advantages of the invention and for a more detailed discussion of its component parts, and its manner of operation, reference is to be had to the following description taken in conjunction with the accompanying drawings in which.

Figure 3:
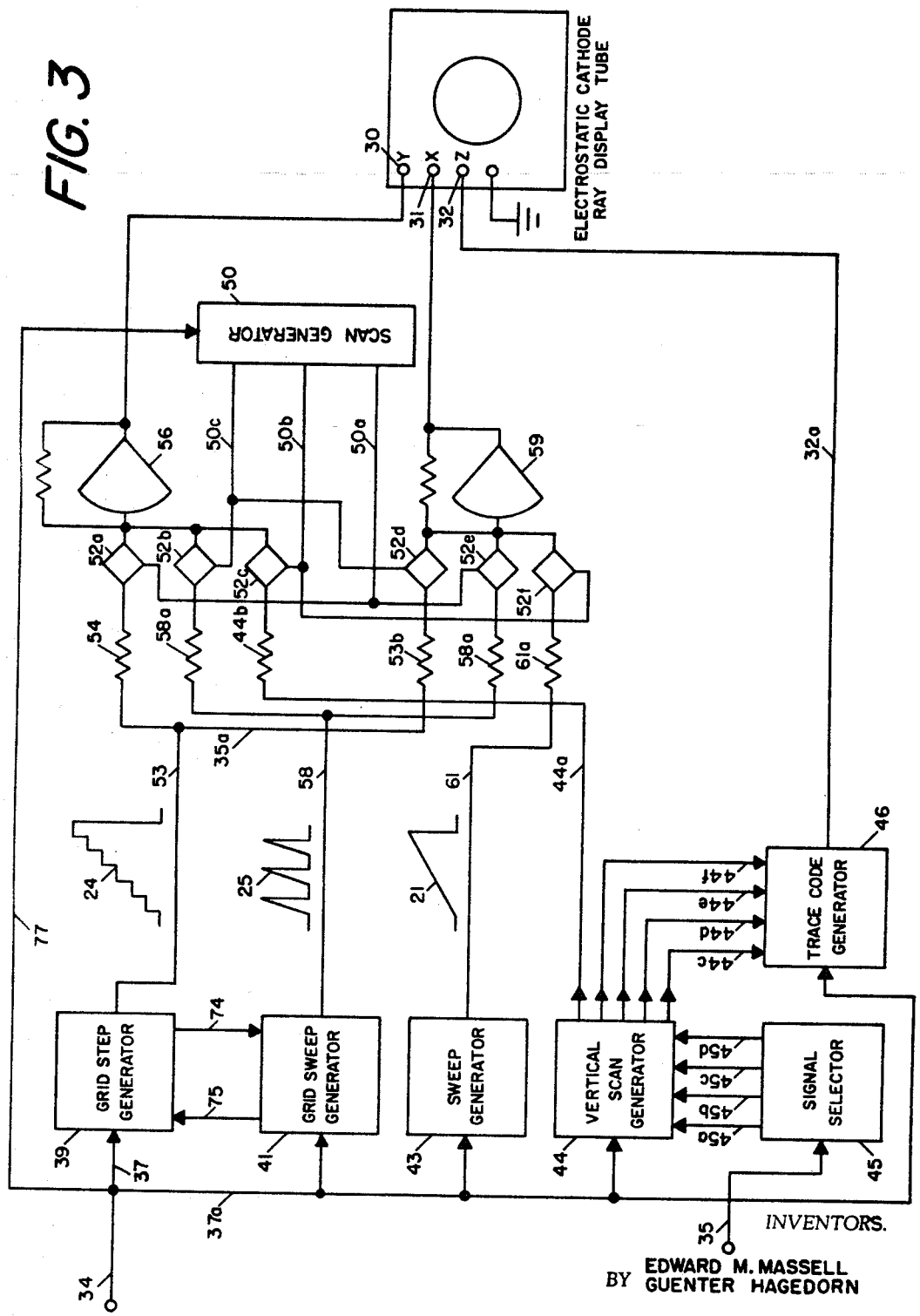
FIG. 3 is a block diagram schematically illustrating the display system of the present invention.
Figure 4:
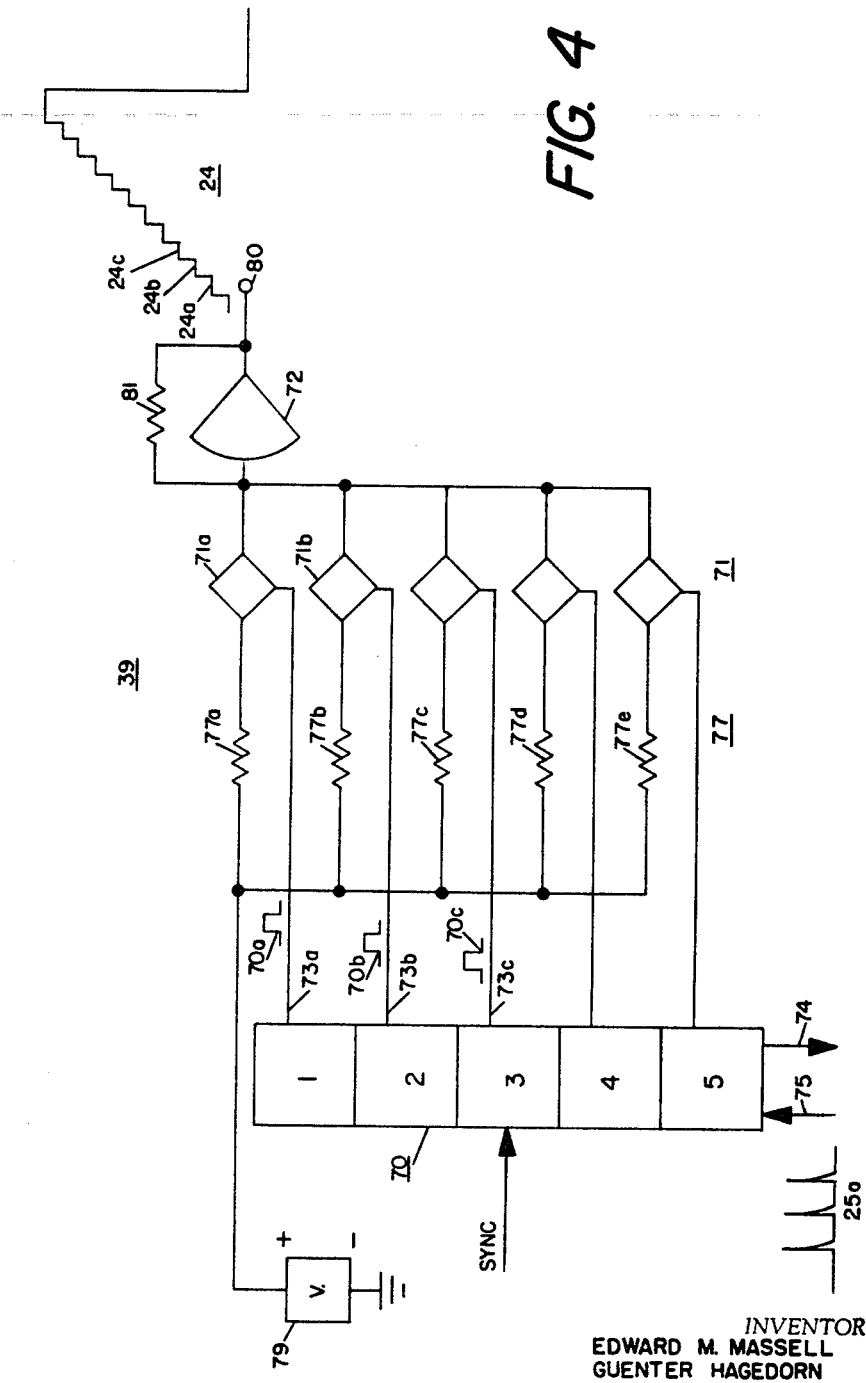
Figure 5:
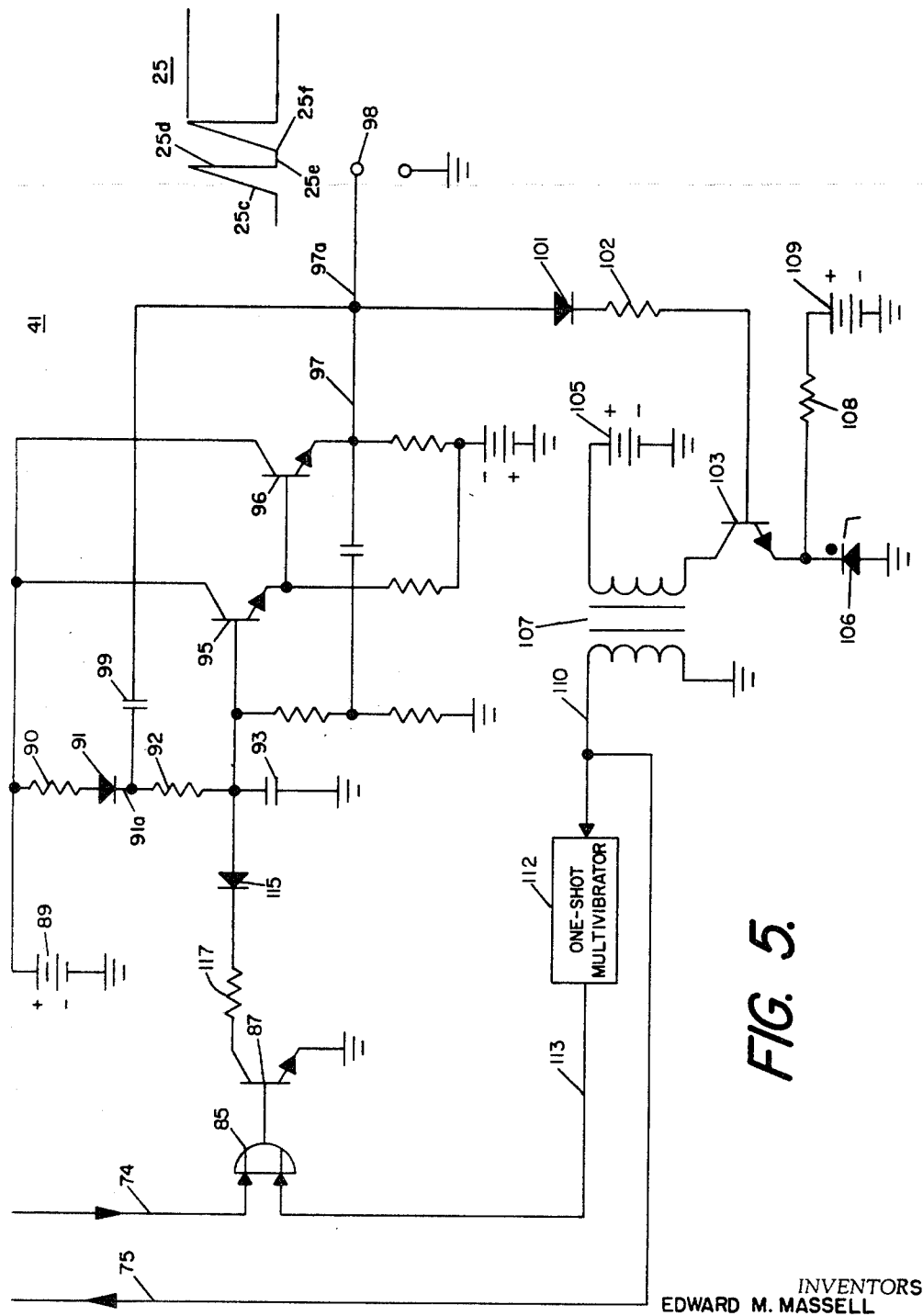
Figure 6:
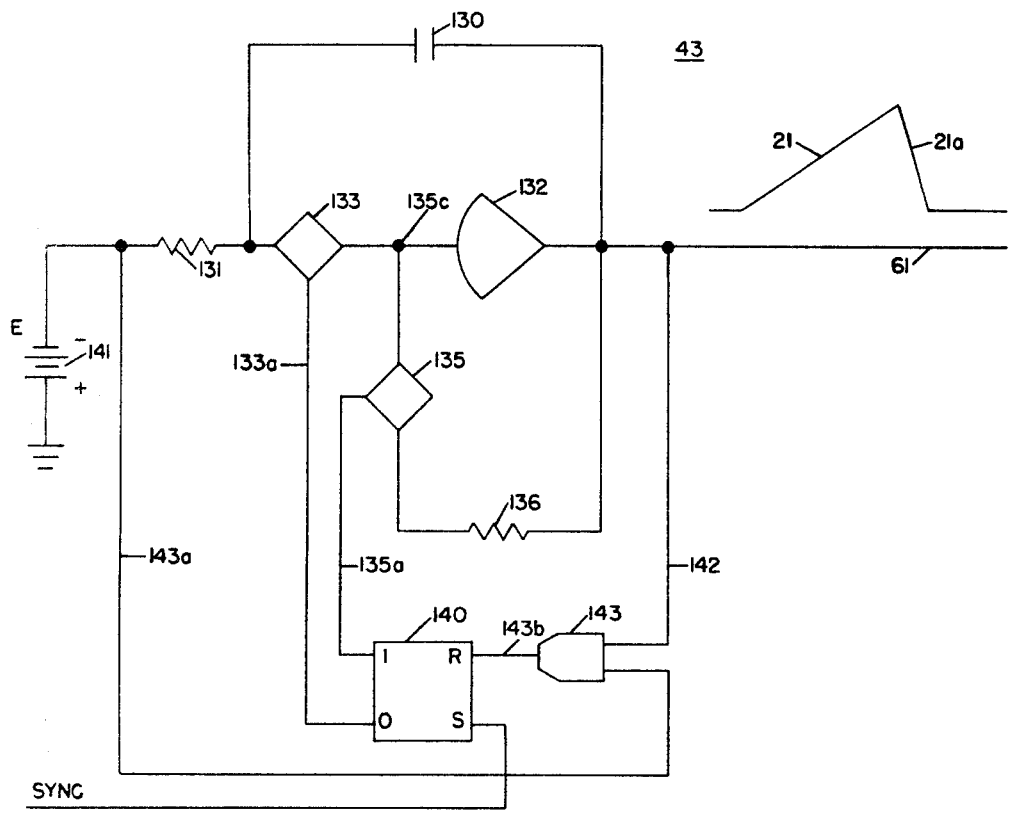
Figure 8A:
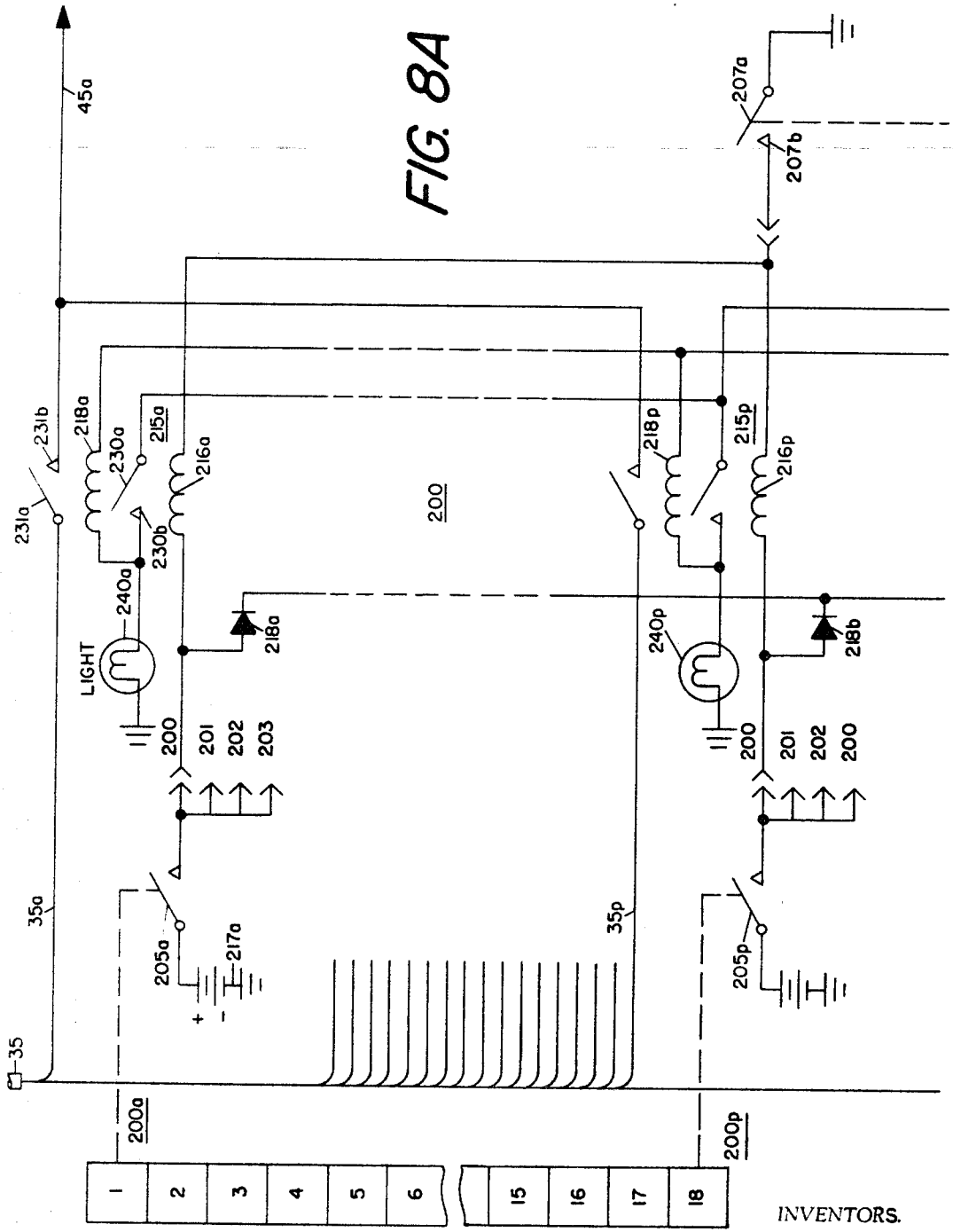

FIG. 4 schematically illustrates a grid step generator appearing in block form in FIG. 3;

FIG. 5 schematically illustrates a grid sweep generator appearing in block form in FIG. 3;

FIG. 6 schematically illustrates a sweep generator appearing in block form in FIG. 3;

FIG. 7 schematically illustrates a vertical scan generator appearing in block form in FIG. 3;

FIGS. 8A and 8B taken together schematically illustrate a signal selector appearing in block form in FIG. 3; and FIG. 9 schematically illustrates a trace code generator appearing in block form in FIG. 3.

Figure 1:
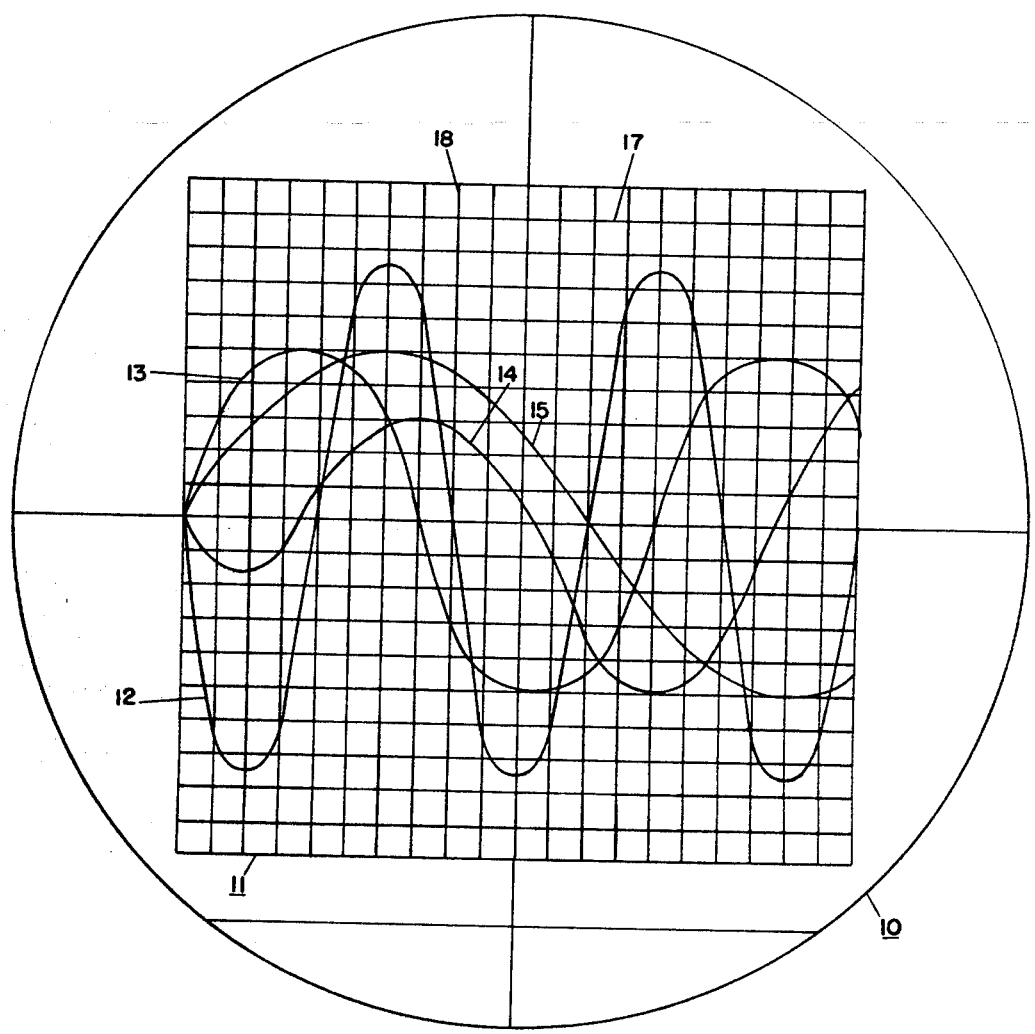
FIG. 1 illustrates the screen of a cathode ray tube having an electronic grid and four information signals displayed thereon.

Referring now to FIG. 1, there is shown a screen 10 of a cathode tube (display tube) of an electrostatic oscilloscope display system. The signals are displayed within the area shown by the rectangle 11. Within this display area 11 there are four distinct traces of information signals 12–15, and there is electronically written a grid having continuous horizontal grid lines 17 and continuous vertical grid lines 18. Information signals 12–15 are continuous traces which may be selectively interrupted in differing patterns thereby to distinguish one trace from another.

Figure 2:
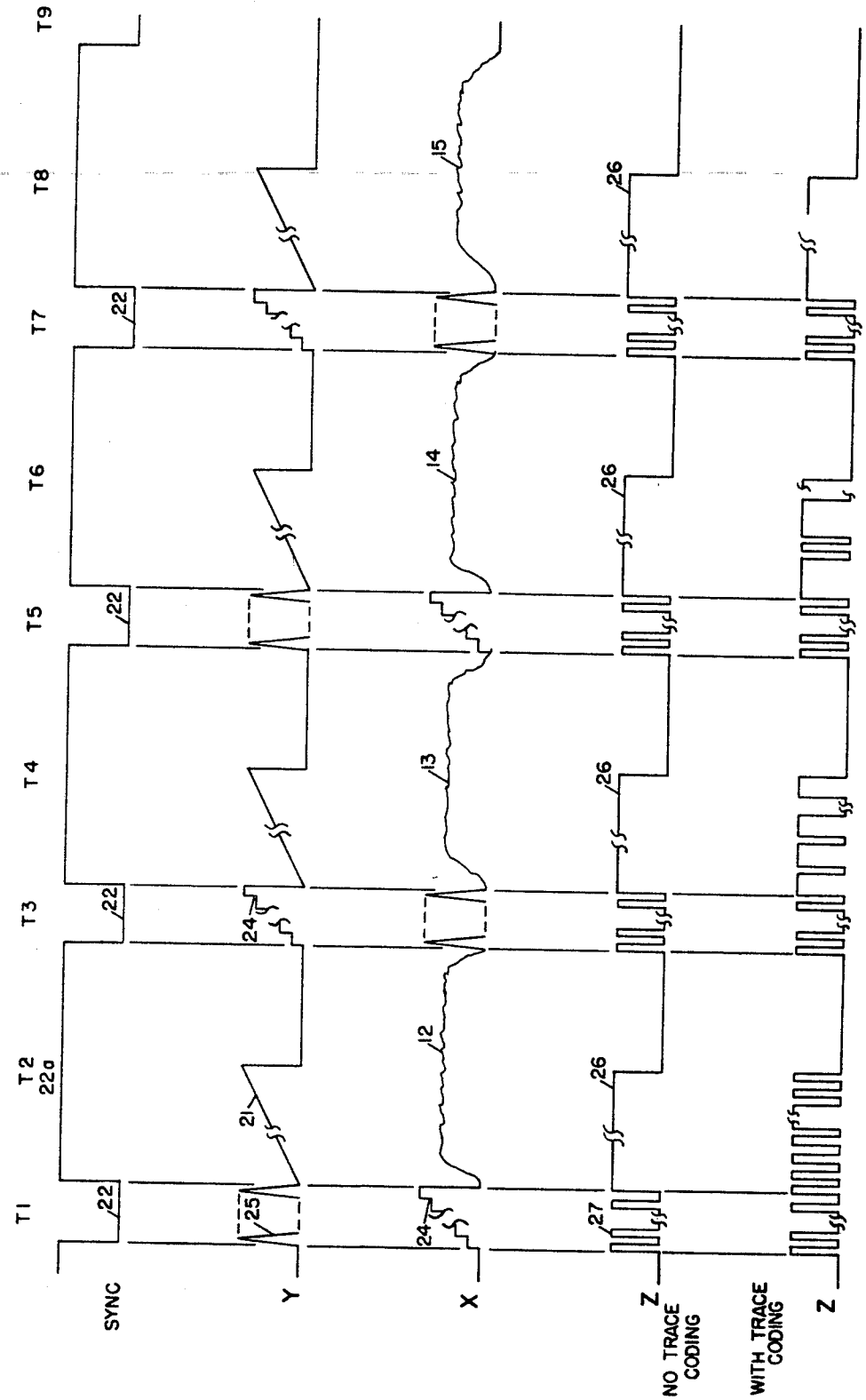
FIG. 2 illustrates waveforms useful in analyzing the invention.

As shown in the waveforms of FIG. 2, information signals 12–15 are time referenced or time shared one with the other and repetitively applied to Y-axis of the tube so that information signal 12 is first in time, information signal 13 is second in time, signal 14 is third in time and signal 15 is fourth in time. In accordance with the repetitive operation after information signal 15, information signal 12 is again displayed and then signal 13, etc. These time reference information signals (synchronization signals) may be obtained from differing sources well known in the art, as for example, from addresses on an analog computer patch panel described in Korn and Korn, Electronic Analog and Hybrid Computers, McGraw-Hill, 1964, at p. 373 et seq. Coincident in time with each of the information signals 12–15, there is generated a periodic pattern of linear sawtooth signals 21 which are applied to the X axis of the cathode ray tube so that information signals 12–15 are displayed as shown in FIG. 1.

As shown in the waveforms of FIG. 2 in sequential operation between each of the information signals 12–15 there is provided synchronization or timing pulse 22 having a periodic pulse pattern with a predetermined repetition rate and time duration. These pulses may be provided by different sources and for example may be obtained from an analog computer as described in the above-cited Korn and Korn text. During the time duration of the sync pulses 22, $T_1$, $T_3$, $T_5$, $T_7$, etc., there is applied to the X and Y axes of the cathode ray tube, signals which will produce an electronic grid. These signals comprise a staircase waveshape 24 having a predetermined number of steps and a similar number of sawtooth signals 25. Each step corresponds to a definite voltage increment. For ease in illustration, only six steps and sawtooth signals have been shown through in a specific example 21 steps and sawtooth signals may be utilized. It will be seen that signals 24 and 25 occur at alternate intervals on the X and Y axes.

It will now be understood that in accordance with the present invention, as shown in the waveforms of FIG. 2, grid signals 24 and 25 are applied to the tube for display thereon, only during the time of the sync or timing signals 22 and the information signals are only applied to the tube during the times between the sync signals, viz., during time 22a. Thus, as shown in FIG. 1, horizontal lines 17 and vertical lines 18 as well as information signal traces 12–15 are displayed on the screen of the cathode ray tube 10. Signals 26 and 27 are applied to the Z-axis of the tube for trace intensification and to limit the signal retraces on the screen.

It will be understood that the staircase signals 24 are in time synchronism with the sawtooth signals 25 so that there is produced continuous grid lines 17 and 18 which will later be described in detail. In this manner by displaying grid lines 17 and 18 electronically, with the information signals 12–15, nonlinearities in the deflection system are effectively eliminated. In other words, any nonlinearities that do exist equally affect both the grid lines 17 and 18 and the information signals 12–15. Therefore, such nonlinearities are not reflected when signals 12–15 are measured with respect to grid lines 17 and 18.

Referring now to FIG. 3, there is shown a block diagram of the display system in which Y signals are applied by way of a Y terminal 30 to the Y input of the electrostatic cathode ray tubes; the X terminal 31 is connected to the X input of the tube and 32 is connected to the Z input of the tube. Sync or timing signals are applied to an input sync terminal 34 and a plurality of information signals are applied by way of an input cable 35 having eighteen conductors each carrying eighteen separate information signals. The sync signals applied to terminal 34 are conducted by way of leads 37 and 37a (1) to an input of a grid step generator 39, (2) to a grid sweep generator 41, (3) to a sweep generator 43, (4) to a vertical scan generator 44, and (5) to a trace code generator 46. In addition, the sync signals are applied by way of a conductor 77 to an input of a scan generator 50.

During the application of a sync pulse 22, as for example during time $T_2$, the grid step generator 39 produces a staircase signal 24 which may have twenty-one steps for example, which will later be described in detail. At the same time, $T_1$, the sync signal 22 is applied to generator 41 to actuate that generator to produce sweep signals 25. Further, at the time of sync pulse 22, the trace code generator 46 produces a series of intensity pulses 27 for application to the Z axis of the cathode ray tube to intensify the electronic grid lines during the time of the sync pulse 22.

As shown in FIG. 2, at the termination of the sync pulses 22 at the end of times $T_1$, $T_3$, $T_5$, etc., and at the beginning of the pulses 22a, at times $T_2$, $T_4$, $T_6$, etc., the sweep generator 43 is actuated to produce the linear sawtooth wave 21. In time coincidence with sawtooth 21, the vertical scan generator 44 is actuated by the sync signal and conducts by way of its output conductor 44a a selected one of four information signals 12–15. More particularly, these four information signals are manually selected from the eighteen information signals applied by way of cable 35 and selected by means of a signal selector 45. Selector 45 is actuated to apply any four of the eighteen information signals to any one of four output conductors 45a–45d which are connected to vertical scan generator 44.

In order to combine the signals from the generators 39, 41, 43, and 44, in the manner and in the times sequence shown in FIG. 2, there is provided a plurality of digital to analog gates (electronic switches) 52 of the type well known in the art and described for example in Patent Nos. 3,130,325 and 3,161,858. Gates 52 are actuated by a scan generator 50 having connections by way of output conductors 50a–50c to particular ones of the gates. For example, during time of the first sync signal 22 ($T_1$), an actuating signal is provided by way of conductor 50a and applied to both gate 52a and to gate 52e to cause those gates to pass signals. As a result, gates 52a and 52e are effective to pass the signals applied on their left hand sides so that the staircase signal 24 from the generator 39 is applied by way of conductor 53, a resistor 54, gate 52a, an amplifier 56 to the Y output terminal 30. Signal 24 is illustrated in FIG. 2 on the Y waveform at time $T_1$. In addition, the sawtooth signals 25 are applied from the generator 41 by way of a conductor 58, a resistor 58a, gate 52e, an amplifier 59 to the X output terminal 31. This is in accordance with FIG. 2 in which the sawtooth signals 25 are shown at the X waveform at time $T_1$.

At the termination of time $T_1$, which is the termination of sync pulse 22, conductor 50a is deenergized by generator 50 and conductor 50b is energized. Thus, an actuating signal is applied to gate 52f so that the linear sawtooth from generator 43 is applied by way of a conductor 61, a resistor 61a, gate 52f and amplifier 59 to the X output terminal 31. Thus, as shown in FIG. 2, during time $T_2$, the linear sawtooth signal 21 is applied to the X axis. In similar manner, the energizing signal on conductor 50b is applied to gate 52c to actuate that gate so that the information signal being passed by generator 44 as for example, information signal 12 is applied by way of conductor 44a and a resistor 44b, gate 52c, amplifier 56 to Y output terminal 30. Thus, as shown in FIG. 2, the information signal 12 is produced at the Y axis during time $T_2$.

In addition, the vertical scan generator 44 produces an output signal on line 44c–44f as the single selected information signal is applied to conductor 44a. The output signal on conductor 44c is directly passed through generator 46 to result at the Z input terminal 32 of an intensifying signal 26 as shown in FIG. 2 as the Z-wave. This intensifying signal is of the same time duration as the linear sweep signal 21 and thus during time $T_2$ the information signal being swept on the Y axis is intensified only during the time of the sweep and not during the retrace time.

It will now be understood that during the time of the first sync signal 22, $T_1$, the electronic grid has been written in one dimension. That is to say, during time $T_1$ the staircase signal 24 has been applied to the Y axis and the sweep signals 25 applied to the X axis. As a result, the horizontal grid lines 17 have been drawn on the screen during time $T_1$. In order to then draw the vertical lines 18 of the grid during time $T_3$, the staircase signal 25 is applied to the X axis while the sweep signals 25 are applied to the Y axis. This change in the signals applied to the X and Y axis is accomplished in the following manner. At the termination of time $T_2$, output conductor 50b of generator 50 is deenergized and conductor 50c is energized to actuate gates 52b and 52d. In this manner, the staircase output signal 24 of generator 39 is applied by way of conductors 53 and 35a, a resistor 53b, gate 52d and amplifier 59 to X output terminal 31. Thus, the staircase waveshape during time $T_3$ appears at the X axis. In similar manner the grid sweep output of generator 41 is applied by way of conductor 58, resistor 58a, gate 52b and amplifier 56 to the Y output terminal 30. Thus, the grid sweep output 25 appears at the Y axis during time $T_3$. In the manner previously described, during the time of the sync signal 22, $T_3$, the trace code generator 46 produces a series of pulses 27 which appear at the Z output terminal 32. In this manner, the vertical grid lines 18 have now been written and it will be understood during the time of the next sync pulse viz., time $T_5$, that the horizontal grid lines will again be written in the manner described above with respect to time $T_1$. During the time of the next succeeding sync pulse, viz., time $T_7$, the vertical grid lines will again be written and this operation continues for succeeding sync pulses.

At the termination of time $T_3$, conductor 50c is deenergized and conductor 50b is again energized to actuate gates 52c and 52f. As previously described, an information signal 13 passed by generator 44 is applied by way of conductor 44a to the Y output terminal 30 and the linear sawtooth signal 21 is applied to the X output terminal 31. It will be understood that information signal 13 has been applied to generator 44 by way of conductor 45b of signal selector 45. In this manner information signal 13 is displayed during time $T_4$. It will also be understood that during time $T_6$ a third information signal 14 applied to generator 44 by way of conductor 45c is displayed on the screen and during time $T_8$ a fourth information signal 15 is displayed on the screen.

In accordance with the invention the grid is accurately calibrated with respect to the information signals since the switching circuits introduce substantially small error. Specifically gates 52a–f as well as amplifiers 56 are selected to be of high accuracy.

The specific structure and operation of the circuits shown in block diagram form in FIG. 3 will now be described in detail:

The grid step generator 39–FIG. 4

The grid generator 39 is shown in FIG. 4 and includes a binary counter 70, digital to analog gates 71 and an amplifier 72. Binary counters are well known in the art and are described for example in Millman and Taub, "Pulse and Digital Circuits," McGraw-Hill, 1956, at chapter 11, et seq. Specifically, at the start of each sync pulse applied by way of conductor 34, counter 70 advances by a first count to produce from a first binary a positive-going pulse 70a. Pulse 70a is applied by way of output conductor 73a to actuate a gate 71a and a negative-going signal is applied by way of conductor 74 to the grid sweep generator 41 to actuate that generator to begin its production of a plurality of pulses 25a during the time of the sync pulse. In a manner later to be described, generator 41 not only provides sawtooth pulses 25 but in time co-incidence therewith also produces spike pulses 25a. Spikes 25a are applied by way of a conductor 75 to advance counter 70 by one for each spike. Thus, at time of the second spike, the second binary of counter 70 produces a pulse 70b to indicate a count of two; at the time of a third spike, both binaries one and two of the counter 70 produces pulses 70a and 70b to indicate a count of three; at the time of the fouth spike, a third binary of the counter 70 produces a pulse 70c to indicate a count of four and so on. The pulses produced by counter 70 are binary weighted by means of the gates 71 and a resistor matrix 77. As well understood in the art, such a resistor matrix 77 comprises a series of resistors each having one half the value of the preceeding resistor. Resistor 77a, for example, may have a value R, resistor 77b may have a value of $R/2$, resistor 77c may have a value of $R/4$, resistor 77d may have a value of $R/8$, and resistor 77e may have a value $R/16$. One end of each of resistors 77a–77e is connected to a source of reference potential 79 having a potential V. Thus, for a count of one output pulse 70a is produced on conductor 73 which is applied to gate 71a to actuate that gate and thus the reference potential from source 79 is applied by way of resistor 77a, gate 71a, amplifier 72 to an output 80. If a feedback resistor 81 for amplifier 72 has a value of $R/20$, then the resultant output voltage is equal of $V/20$, as indicated in FIG. 4 by step 24a in waveform 24. At the time of the next count, a pulse 70b is produced on conductor 73b which actuates gate 71b and thus potential V is applied by way of resistor 77b, gate 71b, amplifier 72 to output terminal 80. In this manner the output potential is equal to a $V/10$ since resistor 77b has a value of $R/2$. This output potential is indicated by the next level 24b shown in the waveform 24. For the next count of three, pulses 70a and 70b are produced on conductors 73a and 73b and a resultant voltage produced at output terminal 80 equal to $3V/20$, which produces level 24c. From the above explanation it will be understood by those skilled in the art that the subsequent series of counts produce voltage steps with the value of each step equal to voltage increase of $V/20$.

Grid sweep generator 41—FIG. 5

It will be remembered that at time $T_1$ a negative-going energizing signal is produced on conductor 74 which actuates the grid sweep generator to begin its production of sweep pulses 25. The energizing signal on conductor 74 is applied to one input of an OR gate 85. Prior to this time, conductor 75, provided a positive signal. OR gate 85 produces a positive-going output if one or both of its inputs are positive. With the signal on conductor 74 changing to negative, OR gate 85 produces a neagtive output to the base of an NPN transistor 87 to render that transistor nonconductive. With transistor 7 nonconductive a capacitor charging circuit may be traced by way of the positive side of a battery 89, a resistor 90, a diode 91, a junction 91a, a resistor 92 and to one side of a capacitor 93, the other side of which is grounded. In this manner, capacitor 93 is charged and such charge is linear as a result of positive feedback applied to junction 91a. This feedback circuit may be traced from the ungrounded side of capacitor 93, and by way of an emitter-follower transistor 95, an emitter-follower transistor 96, a conductor 97, a junction 97a, a capacitor 99 and then to junction 91a. By means of this feedback circuit positive feedback is derived by way of the dual emitter-follower 95 and 96 producing a substantially constant current for application to resistor 92 In this manner capacitor 93 is linearly charged to produce an integrated output when transistor 87 is rendered nonconductive. This charging of capacitor 93 produces at output terminal 98 the rising waveshape 25c, of a first of the grid sweep signals 25.

The foregoing integrated signal is also applied by way of junction 97a through a diode 101, a resistor 102, a base of a transistor 103 rendering that transistor conductive when a preset voltage level is reached. With transistor 103 conductive, a circuit may be traced by way of the positive side of a battery 105, a primary of a pulse transformer 107, transistor 103 and then through a Zener diode 106 to ground. It will be understood that transistor 103 is maintained normally nonconductive as a result of a positive bias potential applied to its emitter by a circuit comprising a resistor 108, a Zener diode 106 and a battery 109.

As a result of the conduction current through the primary of transformer 107, a narrow pulse is produced at its secondary which is applied by way of a conductor 110 to switch a monostable multivibrator 112 to its quasi-stable state. Thus, multivibrator 112 produces a positive pulse, which is applied by way of a conductor 113 to an input of OR gate 85 to produce a positive pulse at the base of transistor 87 rendering that transistor conductive. In addition, it will also be seen that the pulse on conductor 110 is applied by way of conductor 75, as previously described, to the counter 70 of grid generator 39 to advance counter 70 by one count for each of these pulses.

With transistor 87 rendered conductive for the period of the quasi-stable state of the monostable multivibrator 112, capacitor 93 discharges. That discharge circuit may be traced by way of the upper side of capacitor 93, a diode 115, a resistor 117, the collector and emitter of conductive transistor 87 to ground. The exponentially discharging voltage is applied by way of the dual emitter-follower transistors 95 and 96 to the output terminal 98 and is shown as the falling waveshape 25d of a first sawtooth signal 25. At the termination of the quasi-stable state, multivibrator 112 applies a negative-going signal to gate 85 which produces a negative-going signal rendering nonconductive transistor 87. It will be seen that the bottom portion of the sawtooth waveform at 25e indicates that capacitor 93 has fully discharged but the quasi-stable state has not yet terminated. At 25f, transistor 87 has again been rendered nonconductive and the next signal 25 is produced in the manner previously described. During the time $T_1$ of the sync pulse 22, a plurality of such signals 25 are generated, as for example, 21 pulses. At the termination of time $T_1$, conductor 74 has a positive signal applied thereto from binary counter 70, FIG. 4, which is effective to maintain transistor 87 conductive and capacitor 93 discharged.

*Sweep generator 43—FIG. 6*

As previously described, sweep generator 43 produces a sweep signal 21 of varying time duration as time base for the information signals. Generator 43 comprises an operational amplifier 132 having a feedback capacitor 130 and an input resistor 131. The time duration of the sweep signal 21 may be varied by selecting differing values of capacitor 130 and resistor 131 in the manner later to be described.

A normally nonconductive gate or switch, 133, is connected between the junction of resistor 131 and capacitor 130 and the input of amplifier 132. A normally conductive gate 135 is connected in circuit between the input of amplifier 132 and a resistor 136 the other end of which is connected to the output of amplifier 132. The switching of gates 133 and 135 is performed in manner similar to that described in Patent No. 3,161,858. Specifically, gate 133 is maintained nonconductive by means of the switching circuit connected by way of a conductor 133a to the "0" state output of a flip-flop 140. Switch 135 is maintained normally conductive by means of a switching circuit connected by way of a conductor 135a to the "1" state output of flip-flop 140.

Upon application of a sync pulse to a set input S of flip-flop 140, that flip-flop is switched to a state so that an energizing signal is now applied from the "0" output by way of conductor 133a to render conductive switch 133 and an energizing signal is no longer applied to maintain switch 135 conductive. With switch 133 conductive, the negative potential E of battery 141 is applied by way of resistor 131 to the integrating circuit comprising amplifier 132 and its capacitor 130 to provide a linearly rising potential as shown by the waveform 21. Waveform 21 continues to rise and that resultant voltage is applied by way of conductor 142 to one input of a voltage comparator 143 of the type well known in the art and described, for example, in the above-cited Korn and Korn text at page 22 et seq. The other input to voltage comparator 143 is applied by way of the reference supply battery 141 to conductor 143a. In this manner comparator 143 compares the integrated voltage of waveform 21 with the reference potential E.

When the difference between these two voltages equals a predetermined value, for example 10 millivolts, comparator 143 produces an output signal on conductor 143b which is applied to the reset R terminal of flip-flop 140, and is effective to reset that flip-flop. Flip-flop 140 resets gates 133 and 135 by respectively returning to their normal non-conductive and normal conductive states and the integrator is switched to its off state resulting in a discharge of capacitor 130 and a resetting of the amplifier 132, as shown by the waveform 21a.

It will now be understood that the slope of waveform 21 is determined by the values of capacitor 130 and resistor 131 and by changing the slope the time duration of the pulse 21 may be varied. For example, by increasing the slope it will take a shorter time duration for the amplifier to integrate to the reference voltage E supplied by battery 141, while a slow-rising slope will require a longer time duration. The slope is determined by the value of resistor 131 and capacitor 130 in accordance to the following formula:

$$e = 1/RC \int E\,dt$$

where e is the output voltage on conductor 61. The discharge circuit may be traced by way of capacitor 130, resistor 136, gate 135 and amplifier 132. The reset or discharge time duration depends on the value of capacitor 130, resistor 136 and the rate limit of the amplifier 132 and gate 135 combination.

*Vertical scan generator 44—FIG. 7*

As shown in FIG. 7, the vertical scan generator 44 comprises electronic gates 150, a binary coded decimal counter 151 and an operational amplifier 152.

As previously described, information signals are applied on input lines 45a–45d. Sync pulses on conductor 37a are applied to step counter 151 so that in sequence gates 150a, 150b, 150c, and 150d are actuated. With gate 150a actuated, the information signal on conductor 45a is applied by way of resistors 155a, and 155b, gate 150a, and amplifier 152, to the output terminal 44a. It is the termination of the first sync pulses 22, at the end of time $T_1$ which actuates counter 151 to actuate gate 150a for the duration of time $T_2$. Information signal 45a is written during this time $T_2$. At the end of the next sync pulses 22, at the end of time $T_3$, counter 151 is stepped so that now switch 150b is actuated at the start of time $T_3$ and the information signal on conductor 45b is applied by way of resistors 156a and 156b, gate 150b and amplifier 152 to the output terminal 44a. In this manner the information on conductor 45b is written during time $T_4$. In a similar manner, the third sync pulse at the end of time $T_5$ is effective to actuate switch 150c so that the information signal on conductor 45c is written during time $T_6$. The sync pulse at the end of time $T_7$ is effective to step counter 151 so that switch 150d is actuated at the start of time $T_8$, and the information signal on conductor 45d is written during time $T_8$. The counter 151 returns to its initial state and the sequence above described is repeated.

*Signal selector 45—FIG. 8*

As was previously described, eighteen lines of information signals are applied by way of input cable 35 to the signal selector 45, shown in detail in FIG. 8. Signal selector 45 comprises four relay matrices 200–203 each of which includes a plurality of holding relays which, for example, may be of the reed relay type. Each of the matrices 200–203 includes eighteen relay assemblies, e.g., 200a–200p, each corresponding to a different one of the eighteen input information lines, 35a–35p. Control switches 205a–205p are connected to corresponding relay assemblies of the matrices for example, switch 205a is connected to the first relay assembly 200a of matrix 200 and also to the first relay assembly of matrices 201–203 respectively.

In operation, to actuate the first relay of matrix 200, switch 207 is actuated, this switch is mechanically interlocked with switches 208–210. With switch 207 actuated, a contact 207a engages contact 207b and in this way applies ground to one side of the activating coils 216a–216p of relays 215a–215p. In addition, in order to select one of the eighteen information lines 35a–35p a momentary push button 205a–205p may be actuated. For example, push button 205a may be actuated to complete a circuit which may be traced by way of the positive side of a battery 217a, switch 205a, a diode 218a, a capacitor 220 shunted by a resistor 221, and to a winding 223a of a normally closed relay 223 and then to ground. In this manner relay 23 is actuated to shift its movable contact 223b to deenergize the holding coils 218a–218p of each of the relays 215a–215p. As a result of the time constant provided by capacitor 220 and coil 223a, contact 223b is maintained in its open position for a short period of time as for example 5 milliseconds. During that time each of the holding relays 215a–215p are deenergized to reset all of the relays except for relay 215a which has its actuating or operating coil 216a energized by reason of the actuation of switch 205a. Since that actuating coil is energized, movable contact 230a engages a fixed contact 230b, which maintains energized the holding coil 218a of relay 215a. With relay 215a actuated a movable contact 231a engages a fixed contact 231b and thus the signals on information line 35a are applied by way of contact 231a to output conductor 45a and then to the vertical scan generator 44 in the manner previously described. In this manner the information signal on line 35a is written as the first trace 12. Similarly, if switch 205p were actuated at the same time that button 207 is actuated then the information signal on line 35p would be remembered by the holding relay and written as the first trace 12.

The foregoing information signal is displayed continuously on the cathode ray tube and a lamp 240a indicates which one of the relay assemblies 200a–200p has been actuated.

In the same manner, in order to select one of the information signals 35a–35p to write on the second trace display 13, switch 208 may be operated to actuate its corresponding matrix 201. In the manner previously described, with the matrix 201 actuated, any one of the switches 205a–205p may be operated to display any one of the 18 information signals during the time of the second trace 13. In similar manner, any one of the eighteen information signals may be displayed during the time of the third trace 14 if relay matrix 202 is actuated by operation of switch 209. Further, any one of the eighteen information signals may be displayed during the time of the fourth trace 15 by operating switch 210.

It will now be understood that any one of the eighteen input information signals may be displayed on any one of the four traces 12–15 by the simple control of one of the eighteen switches 205a–205p and one of the four switches 207–210 and therefore actuating one of the relays in the relay matrices 200–203.

*Trace code generator 46—FIG. 9*

As previously described, the trace code generator is utilized to identify each of the information traces 12–15. For example, the first trace 12 is identified by code 1 as illustrated in FIG. 9 so that when that code is applied to the Z terminal 32, trace 12 is portrayed as a series of dots.

In similar manner, second trace 13 is identified by code 2 and when that code is applied to the Z input trace 13 is portrayed as a series of dashes. The third trace 14 is identified by code 3 and that trace is portrayed as an alternate series of dashes and dots and the fourth trace 15 is identified by code 4 and that trace is portrayed as a solid trace line.

In order to generate the foregoing codes 1–4 there is provided a multivibrator 300 actuated by the sync signals, a counter 303, and a series of gates having an input from the counter 303 and an input from the vertical scan generator 44. During the time between sync pulses 22 at times $T_2$, $T_4$, $T_6$, $T_8$, etc., multivibrator 300 is actuated to produce a series of pulses 300a. Pulses 300a are applied by way of conductor 302 to the counter 303 comprised of three flip-flops 303a–303c. The binary output chain of pulses of each of its "1" outputs is illustrated by waveforms A–C respectively. It will be understood that the pulse chain A has half the repetition frequency of pulses 300a; pulse chain B has half the repetition rate of pulse chain A; and pulse chain C has half the repetition rate of pulse chain B.

The "1" output of flip-flop 303a is applied by way of a conductor 305 to one input of AND gate 306, the other input of which is connected to conductor 44c. It will be remembered that conductor 44c is connected to the counter 151 of vertical scan generator 44 and is energized only during the time of the first trace 12. In this manner, AND gate 306 is enabled only during the time of the first trace 12 and provides output signals by way of conductor 308 through an OR gate 309 to output Z terminal 32 which is connected to the Z input of the cathode ray tube. Thus, the waveforms A derived from the "1" output of flip-flop 303a are applied through AND gate 306 and OR gate 309 to produce at Z terminal 32 code 1 which "modulates" the intensity input Z to portray a series of dots for the first trace 12.

In order to produce code 2 the "1" output of flip-flop 303a is applied by way of conductor 305 and 305a to one input of an OR gate 312, the output of which is applied to one input of AND gate 314. In addition, the other input of OR gate 312 is connected to the "1" output of the second flip-flop 303b. The remaining input of AND gate 314 is connected to vertical scan generator conductor 44d which is energized only during the time of the second trace 13. Thus, during the time of second trace 13 AND gate 314 is enabled and waveforms A and B combined in OR gate 312 produce a resultant waveform of code 2. This output is applied by way of OR gate 309 to the Z output terminal 32. In this manner signal 13 appears as a series of dashes.

In order to obtain code 3 during the third trace 4, the "1" output of flip-flop 303a is applied by way of conductors 305 and 305b to one input of OR gate 320, the output of which is applied to one input of AND gate 315. In addition, the "1" output of flip-flop 303c is connected by way of conductor 321 to the other input of OR gate 320. The remaining input of AND gate 315 is connected to vertical scan generator 44e which is energized only during the time of the third trace 14. In this way, waveforms A and C are applied to OR gate 320 to produce a resultant waveform of code 3 which is applied through enabled AND gate 315 and OR gate 309 to the output Z terminal 32. Thus, code 3 is produced in which the third trace 14 is displayed as alternate dashes and dots.

Code 4 is simply produced by applying the signal on vertical scan generator conductor 44f directly to the OR gate 309 to produce at output terminal 32 an energizing signal during the entire time of the fourth trace. In this manner, the fourth trace 15 is displayed as a solid trace line. It will now be understood that the foregoing codes 1–4 are produced during time 22a, viz., for the duration of the sweep 21 as shown in FIG. 2.

If trace coding is not desired, then all of the waveforms 12–15 are displayed in their solid line configuration as shown in FIG. 1. To produce this solid line configuration signals 26 are produced during the time of the sweep 21 by actuating to their closed positions switches 314a, 315a, and 316a, FIG. 9. Thus, the signals produced on lines 44c–44f are summed in OR gate 309 and applied to the Z input. When trace coding is again desired the switches 314a, 315a and 316a are actuated to their open positions and the trace coding as previously described is produced.

While there have been shown and described and pointed out the fundamental novel features of the invention as applied to a preferred embodiment, it will be understood that various omissions, substitutions and changes in the form and details of the device illustrated and in its operation may be made by those skilled in the art without departing from the spirit of the invention. It is the intention, therefore, to be limited only as indicated by the scope of the following claims.

What is claimed is:

1. A system for repetitively displaying continuous trace lines including a display tube having a screen comprising,
information means for providing a plurality of information signals,
means for providing timing signals,
means for generating signals for application to said tube to produce a grid display on said screen,
display control means connected to said tube for controlling the application of signals to said tube, and
means for connecting said information signal source, said timing signal means, and said generating means to said display control means for applying said grid and information signals to said tube to write said grid and said information signals on said screen as continuous lines with said grid being written during times between information signals.

2. A repetitive display system including a display tube having a screen comprising
information signal source means for providing a plurality of information signals,
means for providing timing signals in a periodic pulse pattern,
means for generating signals for application to said tube to produce an electronic grid display on said screen,
display control means connected to said tube for controlling the application of signals to said tube, and
means for connecting said information signal source, said timing signal means, and said generating means to said display control means for applying said grid signals to said tube to write said grid on said screen as continuous lines and for applying predetermined ones of said information signals to said tube to write said information signals as continuous lines with said grid being written between information signals.

3. A repetitive display system including a display tube having a screen comprising
information signal source means for providing a plurality of information signals,
means for providing timing signals in a periodic pulse pattern,
means for generating signals for application to said tube to produce an electronic grid display on said screen,
display control means connected to said tube for controlling the application of signals to said tube, and
means for connecting said information signal source, said timing signal means, and said generating means to said display control means for applying said grid signals to said tube only during the time of each said timing signal and for applying predetermined ones of said information signals to said tube only during times between timing signals.

4. The system of claim 3 in which said display control means includes at least one gating means connected in circuit between each of said information signal source and said tube and at least one gating means connected in circuit between said generating means and said tube, and scanning generator means connected to said timing signal means for selectively operating each gating means for opening and closing said circuits.

5. A system for displaying periodically applied information signals with reference to an electronic grid on a screen of a cathode ray tube comprising
a source of timing signals in a periodic pulse pattern having a predetermined repetition rate,
a source of a plurality of information signals,
selector control means connected to said information signal source sequencing individual information signals in time between discrete timing signals,
means for generating signals which when applied to said tube produces an electronic grid display on said screen,
display control means connected to said tube for controlling the application of signals to said tube, and
means for applying said information signals, said timing signals, and said grid signals to said display control means for applying said grid signals to said tube to write said grid on said screen as continuous lines and for applying each of said information signals to said tube to write each said information signal as a continuous line with said grid being written between each said information signal.

6. A system for displaying periodically applied information signals on a screen of a display tube comprising
source of timing signals in a periodic pulse pattern having a predetermined repetition rate,
selector control means having a plurality of information signals applied thereto and operable for producing individual selected information signals each on a differing output,
sequencing means connected to each of said outputs of said selector control means for sequentially applying said selected information signals to an output thereof,
display control means connected to said tube for controlling the application of signals to said tube,
means for applying said timing signals and said output of said sequencing means to said display control means for applying each said information signal to said tube only during the times between timing signals.

7. The system of claim 6 in which there is provided counter means connected to said timing signal source for producing a plurality of chains of pulses,
means for combining differing ones of said chains of pulses to produce resultant coded signals with a different coded signal corresponding to a particular periodically applied information signal, and
means for applying said coded signals to said tube.

8. A system for displaying a predetermined number of periodically applied information signals with reference to an electronic grid on a screen of a display tube comprising,
a source of timing signals having a periodic pulse pattern,
means for generating grid signals for application to said tube to produce an electronic grid display on said screen,
a source of a plurality of any information signals,
selector control means connected to said information signal source having outputs in number at least equal to said predetermined number and operable for producing at each said output a selected information signal,
sequencing means connected to said outputs of said selector control means and to said timing signal source for sequencing said information signals in time between discrete timing signals,
display control means connected to said tube for controlling the application of signals to said tube,
means connecting said display control means to said timing signal source, said generating means and said sequencing means output for applying said grid signals to said tube to write said grid on said screen as continuous lines and for applying said information signals to said tube to write said information signals as continuous lines with said grid being written during times between information signals.

9. The system of claim 8 in which said display control means includes at least one gating means connected in circuit between each of said information signal source and said tube and at least one gating means connected in circuit between said generating means and said tube, and scanning generator means connected to said timing signal source for selectively operating each of said gating means for opening and closing said circuits.

10. A system for simultaneously displaying a predetermined number of information signals on the screen of a cathode ray tube comprising, a source of a plurality of information signals, relay matrices in number at least equal to said predetermined number of information signals, means for applying said plurality of information signals to each of said relay matrices, each of said relay matrices including a separate respective relay assembly for each of said plurality of information signals applied thereto, first control means for selectively actuating each of said relay matrices, second control means for selectively actuating an individual relay assembly of each of said relay matrices to apply to an output of each actuated relay matrix an information signal corresponding to the actuated relay assembly, and means connected to said outputs of said relay matrices for sequentially applying the information signals appearing at said outputs to said cathode ray tube.

11. The system of claim 10 in which each of said relay assemblies includes a holding coil circuit, and in which each of said matrices includes means for opening an energizing circuit for each of said holding coil circuits in an actuated matrix upon actuation of said second control means to reset all of said relay assemblies except for said actuated relay assembly.

12. The system of claim 10 in which there is provided a holding circuit and an operating circuit for each said relay assembly, each of said relay matrices upon actuation having an energizing circuit connected to each of said holding circuits of its relay assemblies for opening said circuit for a period of time upon actuation of said second control means, and means for providing energization for the operating coil of said actuated relay assembly to produce energization for its holding coil to maintain said last-named relay assembly actuated.

13. The system of claim 12 in which said first control means includes switch means for each matrix for connecting one side of each of said operating coils of said relay assemblies a respective matrix to a source of supply, and generator means connected to said sequencing means and to said tube for modulating the signals applied to said tube in accordance with a predetermined code for each relay matrix means output signal.

14. A system for displaying a predetermined number of information signals with reference to an electronic grid on a screen of a cathode ray tube comprising, a source of timing signals in a periodic pulse pattern, means for generating signals for application to said tube to produce an electronic grid display on said screen, a source of a plurality of information signals, relay matrix means in number equal to said predetermined number and each including a plurality of relay assemblies in number equal to said plurality of information signals, means for applying said plurality of information signals to each of said matrix means with each information signal being applied to a corresponding relay assembly, means for actuating each of said matrix means and one of said relay assemblies in each matrix means for providing at an output of each matrix means a selected information signal, display control means connected to said tube for controlling the application of signals to said tube, means for applying said timing signals and said grid signals to said display control means for applying said grid signals to said tube only during the time of each said timing, and sequencing means connected to each said relay matrix means for sequentially applying said information signals produced at said matrix means outputs to said display control means for applying said information signals to said tube only during the times between timing signals.

15. The system of claim 14 in which there is provided generator means connected to said sequencing means and to said tube for modulating the signals applied to said tube in accordance with a different code for each relay matrix means output information signal whereby said information signals are displayed on said screen in differing configurations for each in identifying one information signal from another.

16. A system for displaying a predetermined number of information signals on a screen of a display tube comprising, a source of timing signals in a periodic pulse pattern, a source of a plurality of information signals, means for generating signals for application to said tube to produce an electronic grid display on said screen, relay matrix means in number equal to said predetermined number and each including a separate respective relay assembly for each of said plurality of information signals, means for applying said plurality of information signals to each of said matrix means with each information signal being applied to a corresponding relay assembly, means for actuating each of said matrix means and one of said relay assemblies in each matrix means for providing at an output of each matrix means a selected information signal, display control means connected to said tube for controlling the application of signals to said tube.

17. A system for displaying predetermined number of information signals on the screen of a display tube comprising, a source of timing signals in a periodic pulse pattern having predetermined repetition rate, a signal source for a plurality of information signals, means for generating grid signals for application to said tube to produce an electronic grid display on said screen, relay matrices at least equal in number to said predetermined number of information signals, means for applying said plurality of information signals to each of said relay matrices, each of said relay matrices including a separate relay assembly, each corresponding to a particular one of said plurality of information signals, first signal selector means for selectively actuating a desired one of said relay matrices, second signal selector means for selectively actuating an individual relay assembly of each of said relay matrices to apply to an output of each actuated relay matrix an information signal corresponding to the actuated relay assembly, display control means connected to said tube for controlling the application of differing signals to said tube, means for applying said timing signals and said grid signals to said display control means for application of said grid signals to said tube only during the time of each said timing signal, and means connected to said outputs of said relay matrices for sequentially applying said information signals appearing at said outputs to said display control means for application of said information signals to said tube only during the times between timing signals.

18. The system of claim 17 in which each of said relay assemblies includes a holding coil circuit, and in which each of said matrices includes means for opening an energization circuit for each of said holding coil circuits in an actuated matrix upon actuation of said second signal selector means to reset all of said relay assemblies except for the actuated relay assembly.

19. The system of claim 17 in which there is provided a holding coil and an operating coil for each said relay assembly, each of said relay matrices upon actuation having an energizing circuit connected to each of said holding coils of its relay assemblies for opening said circuit for a period of time upon actuation of said second signal selector means, and means for providing energization for the operating coil of said actuated relay assembly to produce energization for its holding coil.

20. The system of claim 19 in which said first signal selector means includes switch means for each matrix for connecting one side of each of said operating coils of said relay assemblies a respective matrix to a source of supply.

21. A system for displaying a predetermined number of periodically applied information signals on the screen of a display tube in which said information signals are identfiable one from the other comprsing, a source of timing signals in a periodic pulse pattern having a predetermined repetition rate, means including sequencing means connected to said tube for sequentially applying said information signals to said tube, counter means connected to said timing signal source for producing a plurality of chains of pulses, and means for combining differing ones of said chains of pulses to produce resultant coded signals with a different coded signal corresponding to a particular periodically applied information signal.

22. The system of claim 21 in which said counter means includes a multivibrator connected to said timing signal source, said counter means comprising a plurality of interconnected bistable circuits for producing output pulse chains having differing repetition rates, and said combining means comprising a plurality of gates for combining differing pulse chains to produce said differing coded signals.

23. A system for displaying a predetermined number of periodically applied information signals on the screen of a cathode ray tube in which said information signals are identifiable one from the other comprising, a source of timing signals in a periodic pulse pattern having a predetermined repetition rate, means including sequencing means connected to said tube for sequentially applying said information signals to said tube only during the times between timing signals, binary counter means connected to said timing signal source for reproducing a plurality of differing series of pulses, means connected to said timing signal source for periodically combining differing ones of said series of pulses to produce resultant coded signals, and means for applying said coded signals to an input of said tube for differently portraying each of said periodically applied information signals.

24. The system of claim 23 in which said counter means includes a multivibrator connected to said timing signal source, said counter means comprising a plurality of interconnected bistable circuits for producing output pulse chains in which the repetition rate of a pulse chain from a bistable circuit is half that of a pulse chain from a preceding bistable circuit, and said combining means comprising a plurality of gates for combining differing pulse chains to produce said differing coded signals.

References Cited

UNITED STATES PATENTS

| | | | |
|---|---|---|---|
| 2,666,868 | 1/1954 | McMillan | 315—22 |
| 3,323,105 | 5/1967 | Charske | 315—25 X |
| 3,335,315 | 8/1967 | Moore | 340—324 XR |

RODNEY D. BENNETT, *Primary Examiner.*

M. F. HUBLER, *Assistant Examiner.*